US006747656B2

United States Patent
Matsushita

(10) Patent No.: US 6,747,656 B2
(45) Date of Patent: Jun. 8, 2004

(54) IMAGE PROCESSING APPARATUS AND METHOD OF THE SAME, AND DISPLAY APPARATUS USING THE IMAGE PROCESSING APPARATUS

(75) Inventor: Shinichi Matsushita, Kanagawa (JP)

(73) Assignee: Sony Corporation, Tokyo (JP)

( * ) Notice: Subject to any disclaimer, the term of this patent is extended or adjusted under 35 U.S.C. 154(b) by 474 days.

(21) Appl. No.: 09/826,084

(22) Filed: Apr. 4, 2001

(65) Prior Publication Data

US 2002/0021300 A1 Feb. 21, 2002

(30) Foreign Application Priority Data

Apr. 7, 2000 (JP) ..................................... P2000-111936

(51) Int. Cl.[7] ............................................ G06F 13/372

(52) U.S. Cl. ...................... 345/534; 348/567; 348/571; 382/254

(58) Field of Search ................................. 345/534, 543, 345/544, 545; 348/567, 571; 382/254, 276

(56) References Cited

U.S. PATENT DOCUMENTS

| 5,045,955 | A | * | 9/1991 | Ikeda | .......................... 386/100 |
| 5,878,173 | A | * | 3/1999 | Hashimoto et al. | ......... 382/282 |
| 6,469,746 | B1 | * | 10/2002 | Maida | ......................... 348/564 |

* cited by examiner

Primary Examiner—Matthew C. Bella
Assistant Examiner—Mackly Monestime
(74) Attorney, Agent, or Firm—Jay H. Maioli

(57) ABSTRACT

An image processing apparatus and method, and a display apparatus capable of preventing field tearing caused by memory overrun even when performing a read operation and a write operation of input/output images with respect to a single image memory, wherein a system microcomputer (MC) is used for generating and supplying output delay data for delaying an image output timing based on the write speed to the image memory, the read speed from the image memory, and the read area so that the timing of access to the read end address address and the timing for performing a write operation to the same address match and of a scan converter for receiving the output delay data supplied by the system MC and delaying the image output timing so that the timing of access to the read end address and the timing for performing a write operation to the same address match.

8 Claims, 21 Drawing Sheets

FIG.13 (PRIOR ART)
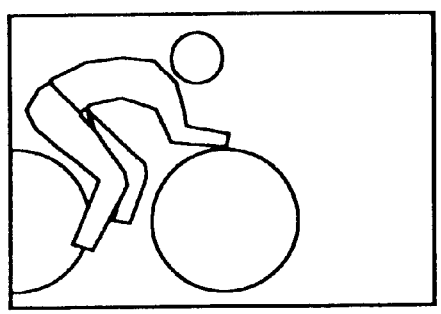 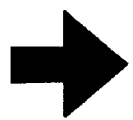 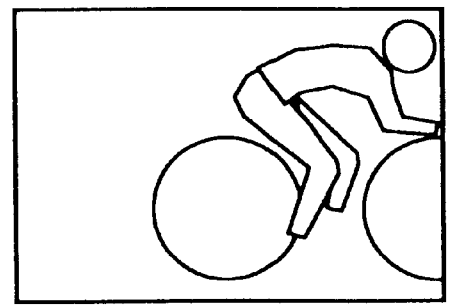
FIRST FRAME                             SECOND FRAME FIG.18 (PRIOR ART)
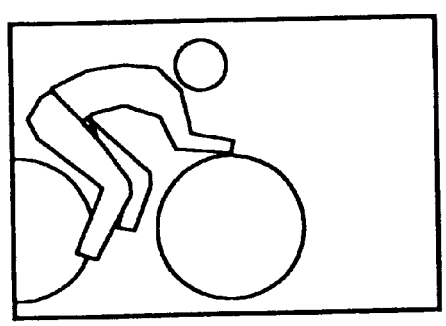 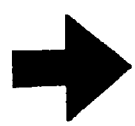 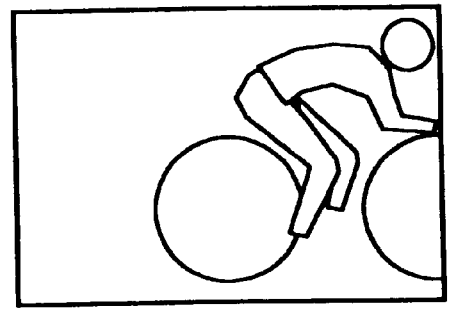
FIRST FRAME  SECOND FRAME

IMAGE PROCESSING APPARATUS AND METHOD OF THE SAME, AND DISPLAY APPARATUS USING THE IMAGE PROCESSING APPARATUS

BACKGROUND OF THE INVENTION

1. Field of the Invention

The present invention relates to an image processing apparatus performing for example asynchronous input/output type digital image processing using an image memory and a method of the same, and a display apparatus using the image processing apparatus.

2. Description of the Related Art

In asynchronous input/output type digital image processing using a image memory, a write operation of image data into the image memory and a read operation of image data from the image memory are performed independently. For this reason, sometimes input frames are switched in the middle of image output.

In general, in the case of a still image having a high correlation between frames such as with graphics, this switching cannot be discerned so does not become a problem.

In the case of a moving image, however, this creates a horizontal stripe which constitutes noise moving on the screen. This memory overrun is referred to as "field tearing".

Conventionally, as a method of avoiding this field tearing (memory overrun), mainly a "double buffer method" of using a plurality of image memories and storing the image data in a different memory for every frame and an "output line delay method" of adjusting read and write timings of the input/output images with respect to a single image memory have been employed.

Summarizing the problem to be solved by the invention, generally, when processing a moving image, however, use is made of a vertical synchronization method of locking a phase of an output side vertical synchronization signal V-SYNC with the input, so the problem of the field tearing can be solved by the "double buffer method" of processing the input signal in a different memory for every field (or frame).

This "double buffer method", however, requires a large capacity memory, so there is a disadvantage of an increased cost.

The "output line delay method" is free from any cost disadvantage and is a general function available in almost all scan converters at present.

This conventional "output line delay method", however, has the disadvantage that it is difficult to avoid field tearing under all conditions with a fixed amount of delay since the required delay differs according to the frequencies of the input and output signals and degree of a special image processing such as enlargement or reduction of the image.

Also, field tearing becomes noise discernable only with respect to the moving image portion, therefore it was not practical to have the user adjust the number of delay lines.

Below, an explanation will be given, with reference to the drawings, of the reason why memory overrun is fixed on a screen in the vertical synchronization mode in the "output line delay method" for the case of enlargement and reduction.

First, an explanation will be given of the case of enlargement with reference to FIG. 12 to FIG. 16.

FIG. 12 is a view of an image write area and read area of a frame memory in a case where an image is enlarged 2-fold in the vertical synchronization mode at the time of input of a still image.

In FIG. 12, reference numeral 1 denotes a frame memory, ARWR an image write area, and ARRD a read area.

As will be understood from FIG. 12, the memory area ARRD accessed on the read side is a half of the memory area ARWR accessed on the write side.

Also, because of the vertical synchronization mode, the times required for the write and read operations of the image in 1V (1 vertical synchronization period) are the same, so a write speed of the image becomes two times the read speed.

The vertical synchronization signals V-SYNC serving as the triggers for starting the write and read operations are identical in terms of time, but the positions for starting the access differ (concretely, in FIG. 12, a write start position is (a) and a read start position is (b)), therefore, right after the start of access, the already written information of one frame before is read and written (in FIG. 12, a write end position is (c) and a read end position is (d)), then the information of the current frame is read.

Next, an explanation will be given of the principle of the occurrence of field tearing at the time of enlargement with reference to moving image samples shown in FIG. 13.

FIG. 14 is a view of the transition over time of the image data inside a frame memory and output images in a case where two consecutive frames having different image information as shown in FIG. 13 are processed in the vertical synchronization mode.

In FIG. 14, the center portion of the image is cut out, so the memory positions of the write and read operation match at the center of the screen. The timings of the read and write operations become reversed at this position. The field tearing from an old image to a current image occurs there.

Even when changing the enlargement rate, the relationship of "write area>read area" is held, so the field tearing always occurs at the screen center due to a similar reason.

FIG. 15 is a view of the transition over time of the image data inside the frame memory and the output images in a case where an image is shifted downward.

When shifting the image phase, the situation differs according to the amount and direction of movement.

The downward shift of the image means to take out an upper portion data of the memory.

In this case, the positions of the memory for starting access match, in other words, since the write operation and the read operation start from the identical line and the write speed is two times of the read speed, overrun does not occur or field tearing is caused at the uppermost portion of the screen, generally, a blanking area.

Also, FIG. 16 is a view of the transition over time of the image data inside the frame memory and the output images in a case where an image is shifted upward.

As shown in FIG. 16, when shifting an image upward, the positions of the memory where the accesses end match, in other words, the write and read operations end on the same line, so the field tearing will occur in the lowermost portion of the screen or the field tearing will not occur.

As will be understood from the above description, the position of occurrence of field tearing varies according to the enlargement rate and the amount of shift. Depending on the amount of the shift, there are also cases where the field tearing is hidden in the blanking area, but in principle the field tearing always occurs.

First, an explanation will be given of the case of reduction with reference to FIG. 17 to FIG. 21.

FIG. 17 is a view of the image write area and read area of a frame memory in a case where an image is reduced to ½ (image center reduction) in the vertical synchronization mode at the time of input of a still image.

In this case, the memory areas accessed on the read side and the write side are identical.

Because of the vertical synchronization mode, the vertical synchronization signals V-SYNC serving as the triggers for starting the write and read operations are identical in terms of time, but the times for starting access differ (in FIG. 17, the write start position is (a) and the read start position is (b)).

In the period immediately after the start of access and up to the read start position (b), the memory is not accessed for a read operation. Only the lines are counted, and blanking is applied to the screen.

At the point of time of the read start position (b), the image of the current frame has been already written up to ¼ of the entire image, so the image taken out at the time of the start of the read operation of the memory is the data of the current frame.

On the other hand, at the end of the read operation (indicated by (d) in FIG. 17), irrespective of the end line of the memory being read, the write side has finished only ¾ of the entire image, so the data of the previous frame ends up being read at the lower portion of the screen.

Below, an explanation will be given of the principle of field tearing by using the moving image samples shown in FIG. 18 in the same way as the time of enlargement.

FIG. 19 is a view of the transition over time of the image data inside the frame memory and the output images in the case where two consecutive frames having different image information as in FIG. 18 are processed in the vertical synchronization mode.

In FIG. 19, the center portion of the screen is cut out, so the positions in the memory of the write and read operations match at the screen center, the timings of the read and write operations become reversed at this position, and the field tearing from the current image to the old image occurs there.

Even when changing the reduction rate, the relationship of "write time>read time" is held, so the field tearing always occurs at the screen center for a similar reason.

FIG. 20 is view of the transition over time of the image data inside the frame memory and the output images in the case when an image is shifted upward.

In the same way as the time of enlargement, when shifting the image phase, the situation differs according to the amount and direction of movement.

In this case, since the positions of the memory where the accesses are started match, in other words, the write and read operations start from the identical line, and the read speed is two times the write speed, the field tearing does not occur or the field tearing is caused in the uppermost portion of the screen, generally, the blanking area.

FIG. 21 is a view of the transition over time of the image data inside the frame memory and the output images in the case where an image is shifted downward.

As shown in FIG. 21, when shifting an image downward, the positions of the memory where the accesses end match, in other words, the write and read operations end on the same line, so the field tearing will occur in the lowermost portion of the screen or the field tearing will not occur.

As seen from the above description, the position of occurrence of field tearing varies according to the reduction rate and the amount of shift. Depending on the amount of shift, the field tearing is sometimes hidden in the blanking area, but in principle the field tearing always occurs.

SUMMARY OF THE INVENTION

An object of the present invention is to provide an image processing apparatus capable of avoiding the occurrence of field tearing (memory overrun) even when read and write operations of input/output images are carried out with respect to a single image memory and a method of the same, and a display apparatus using the image processing apparatus.

According to a first aspect of the present invention, there is provided an image processing apparatus for performing read and write operations of input/output images with respect to a single image memory, comprising a first circuit for generating an image output timing based on at least a read area of the image memory so that a timing of access of a read position in the read area which becomes a boundary with a non-read area, that is, a blanking period, and a timing for performing a write operation at substantially the same position substantially match and a second circuit for performing a write operation of the input image to the image memory and outputting an image read from the image memory at the image output timing generated at the first circuit.

Further, in the image processing apparatus of the present invention, the first circuit generates the image output timing based on the read area of the image memory, a write speed to the image memory, and a read speed from the image memory.

Further, in the image processing apparatus of the present invention, the second circuit performs the write operation of the image to the image memory and the read operation of the image from the image memory in synchronization with vertical synchronization signals, and the first circuit generates the image output timing by setting the phases of the output vertical synchronization signals so that the read position which becomes the boundary of the output image and the write position match in time.

Alternatively, in the image processing apparatus of the present invention, the first circuit delays the image output timing so that the timing of access to a read end address and the timing for performing a write operation at substantially the same address substantially match.

Alternatively, in the image processing apparatus of the present invention, the first circuit delays the image output timing so that the timing of access to a read start address and the timing for performing a write operation at substantially the same address substantially match.

According to a second aspect of the present invention, there is provided an image processing method for performing read and write operations of input/output images with respect to a single image memory, comprising a first step of generating an image output timing based on at least a read area of the image memory so that a timing of access of a read position in the read area which becomes a boundary with a non-read area, that is, a blanking period, and a timing for performing a write operation at substantially the same position substantially match and a second step of performing a write operation of the input image to the image memory and outputting an image read from the image memory at the image output timing generated at the first step.

According to a third aspect of the present invention, there is provided a display apparatus for performing read and write operations of input/output images with respect to a single image memory, comprising: a first circuit for generating an image output timing based on at least a read area of the image memory so that a timing of access of a read position in the read area which becomes a boundary with a non-read area, that is, a blanking period, and a timing for performing a write operation at substantially the same position substantially match and a second circuit for performing a write operation of the input image to the image memory and outputting an image read from the image memory at the image output timing generated at the first circuit.

Further, in the display apparatus of the present invention, the first circuit generates the image output timing based on the read area of the image memory, a write speed to the image memory, and a read speed from the image memory.

Further, in the display apparatus of the present invention, the second circuit performs the write operation of the image to the image memory and the read operation of the image from the image memory in synchronization with vertical synchronization signals, and the first circuit generates the image output timing by setting the phases of the output vertical synchronization signals so that the read position which becomes the boundary of the output image and the write position match in time.

Alternatively, in the display apparatus of the present invention, the first circuit delays the image output timing so that the timing of access to a read end address and the timing for performing a write operation at substantially the same address substantially match.

Alternatively, in the display apparatus of the present invention, the first circuit delays the image output timing so that the timing of access to a read start address and the timing for performing a write operation at substantially the same address substantially match.

According to the present invention, for example in the first circuit, output timings of the write timing and the read timing of the image memory are generated based on the write speed to the image memory, the read speed from the image memory, and the read area so that the timing of access to the read end address (or the timing of access to the read start address) and the time for performing a write operation to the same address match and supplied to the second circuit.

In the second circuit, upon receipt of the timing information supplied by the first circuit, the image output timing is adjusted so that the timing of access to the read end address (or the timing of access to the read start address) and the timing for performing a write operation at the same address match and output the image read from the image memory at this timing.

By this, field tearing is avoided in various input/output signals and image enlargement/reduction.

BRIEF DESCRIPTION OF THE DRAWINGS

These and other objects and features of the present invention will become clearer from the following description of the preferred embodiments given with reference to the accompanying drawings, in which:

FIG. 13 is a view for explaining the problem in the prior art and showing moving image samples for explaining a principle of occurrence of field tearing at the time of enlargement;

FIG. 18 is a view for explaining the problem in the prior art and showing moving image samples for explaining the occurrence of field tearing at the time of reduction;

DESCRIPTION OF THE PREFERRED EMBODIMENTS

Figure 1:
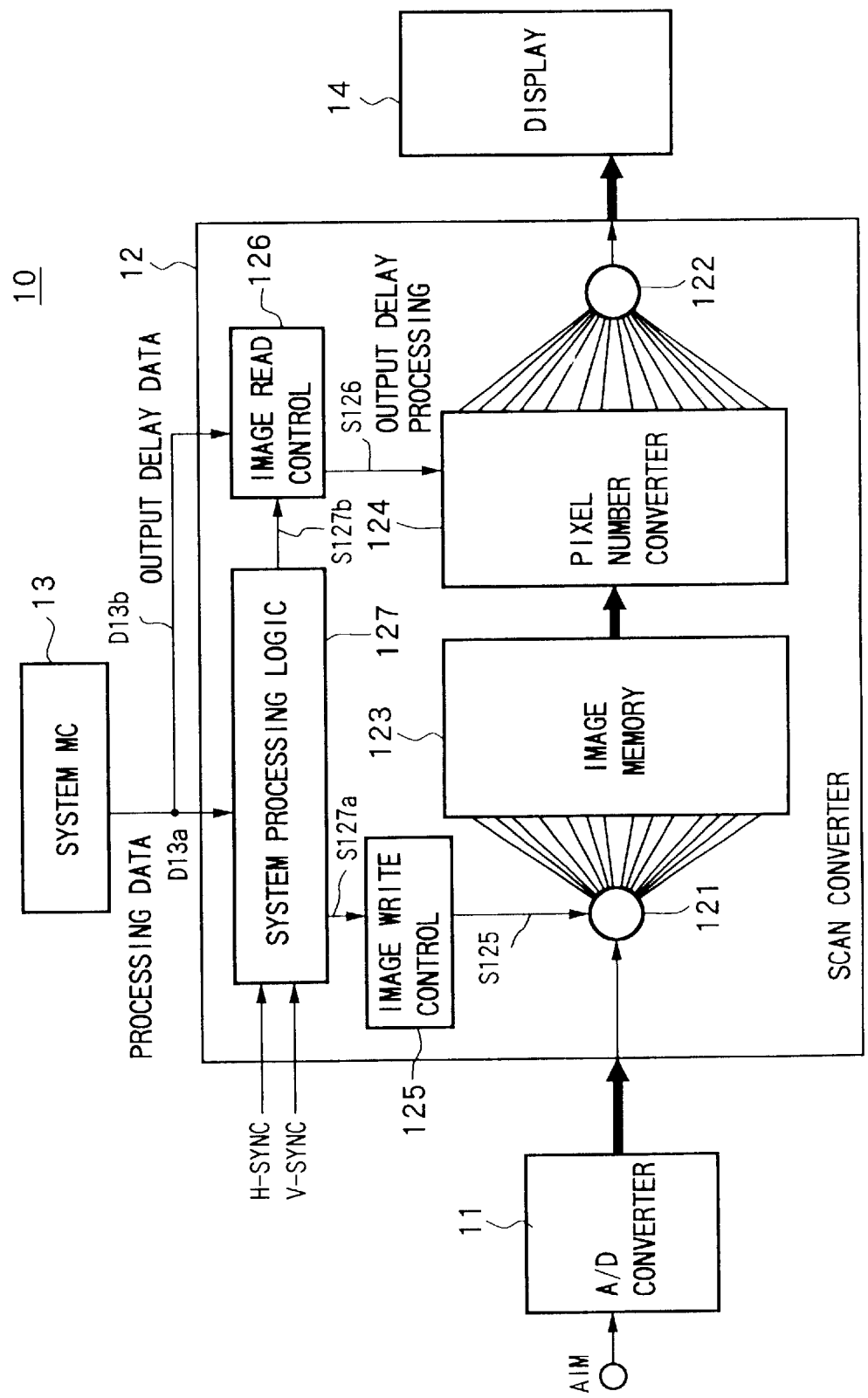
FIG. 1 is a block diagram of the configuration of an embodiment of an image processing apparatus according to the present invention.

Below, an explanation will be made of embodiments of the present invention by referring to the drawings.

FIG. 1 is a block diagram of the configuration of an embodiment of an image processing apparatus according to the present invention.

The present image processing apparatus 10 comprises, as shown in FIG. 1, an analog/digital (A/D) converter 11, a scan converter 12 as the second circuit, a system microcomputer (hereinafter, referred to as a "system MC") 13 as the first circuit, and a display 14 as main components.

Note that, the display 14 in this embodiment is a display device having a fixed number of pixels such as a plasma display panel (PDP), an organic electroluminescence (EL) panel, a liquid crystal panel or a field emission device (FED). But other display device including CRT is also used for display 14 applying this image processing apparatus 10 which has the scan converter and converting the output signal from digital signal to analog signal.

The A/D converter 11 converts an input analog image signal AIM to the digital signal and supplies the same to the scan converter 12.

The scan converter 12 has one image memory, receives the digital image signal by the A/D converter 11, performs a write operation on the image memory at a timing generated based on a supplied horizontal synchronization signal H-SYNC and vertical synchronization signal V-SYNC, reads a written image signal from the identical image memory, and displays it on a display 14 at an equal magnification or processed for image enlargement or image reduction (pixel number conversion).

When performing a write operation on the identical image memory and a read operation from the image memory as described above, the scan converter 12 receives the processed data and output delay data supplied from the system MC 13 and delays the image output timing so that the timing of access to the read end address (or the timing of access to the read start address) and the time for performing the write operation to the same address match so as to avoid the field tearing (memory overrun) occurring when the image write speed and the read speed to and from the identical image memory differ.

The scan converter 12 comprises, as shown in FIG. 1, an input unit 121, an output unit 122, an image memory 123, a pixel number converter 124, an image write controller 125, an image read controller 126, and a system processing logic 127.

The input unit 121 writes the digital image signal from the A/D converter 11 at a designated address of the image memory 123 based on a control signal S125 from the image write controller 125.

The output unit 122 outputs a read image signal from the pixel number converter 124 to the display 14 for display.

In the image memory 123, the write and read operations of the image signals are simultaneously carried out in parallel, the write operation is sequentially carried out at the designated addresses by the input unit 121 under the control of the image write controller 125, and the written image signals are read to the pixel number converter 124 at predetermined timings under the control of the image read controller 126.

The pixel number converter 124 delays the timing of processing an image signal read from the image memory 123 by exactly an amount of delay based on an output delay processing signal S126 supplied from the image read controller 126 and supplies the read image signal to the output unit 122 at equal magnification as is or processed for image enlargement or image reduction.

The image write controller 125 supplies a write timing S127a supplied by the system processing logic 127 as a control signal S125 to the input unit 121 and has it write at the designated address of the image memory 123.

The image read controller 126 generates an output delay signal S126 based on a read timing S127b supplied by the system processing logic 127 and the output delay data supplied by the system MC 13 and outputs the same to the pixel number converter 124.

The system processing logic 127 generates the timing for writing an image signal into the image memory 123 and the timing for reading the same from the image memory 123 based on the supplied horizontal synchronization signal H-SYNC and vertical synchronization signal V-SYNC and processing data D13a supplied by the system MC 13, supplies the write timing signal S127a to the image write controller 125, and supplies the read timing signal S127b to the image read controller 126.

The system MC 13 generates processing data D13a for generating the write timing and the read timing of the image memory 123 of the scan converter 12, supplies the same to the system processing logic 127, generates output delay data D13b for delaying the image output timing so that the timing of access to the read end address (or the timing of access to the read start address) and the timing for performing a write operation to the same address match based on the write speed to the image memory 123, the read speed from the image memory 123, and the read area, and supplies the same to the image read controller 126.

In this way, the system MC 13 automatically calculates the amount of delay of the output timing based on the timings of access of the image memory 123 and avoids field tearing in all input/output signals and image enlargement/reduction.

This system MC 13 calculates the amount of delay of the output timing for 1) processing for making the timings of access to a read end address in a memory and a write address match ("processing for matching read end time (end line)") or 2) processing for making the timings of access to a read start address in a memory and a write address match ("processing for matching read start time (start line)").

Below, an explanation will be given of the two processings with reference to the drawings.

First, an explanation will be given of the processing for matching the read end time (end line), then an explanation will be given of the processing for matching the read start time (start line).

Figure 2:
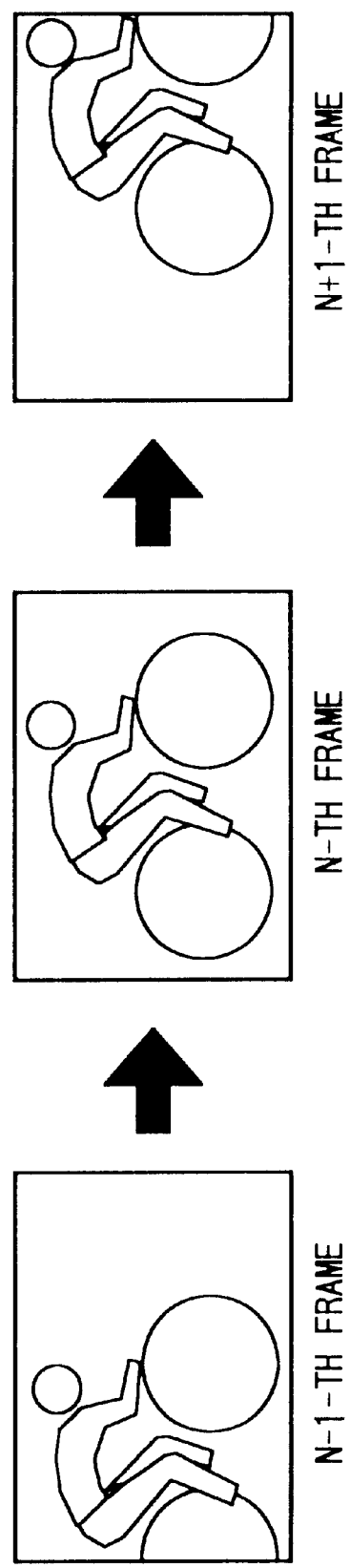
FIG. 2 is a view for explaining the processing for calculating an amount of delay in a system MC according to the present invention and showing moving image samples in a case of three consecutive frames are input to an image memory.

Also, here, as shown in FIG. 2, the explanation will be given by taking as an example a case where three consecutive frames of a moving image, that is, an n–1-th frame, an n-th frame, and n+1-th frame, are written into and read from the image memory 123.

Processing for Matching Read End Time (End Line)

Figure 3:
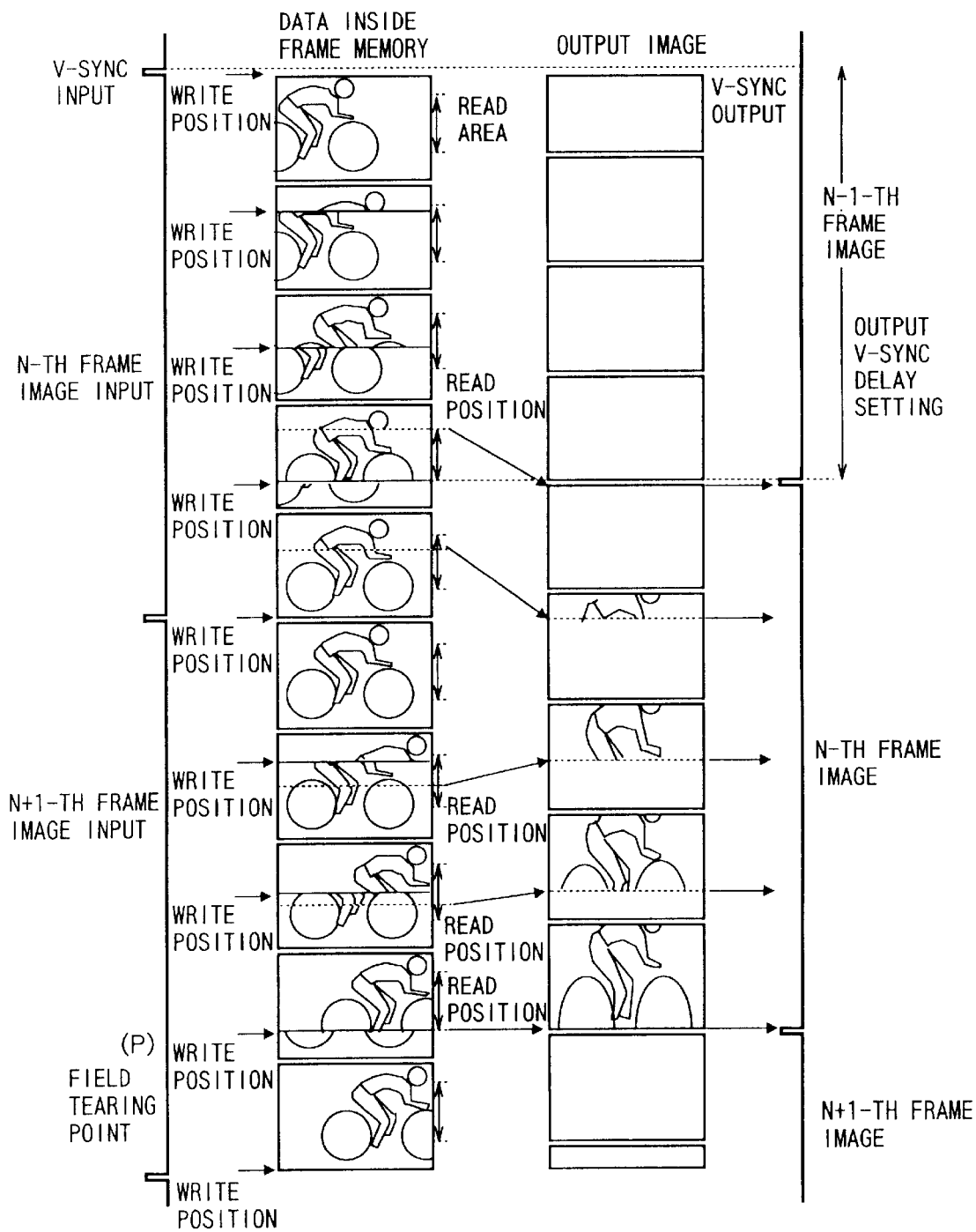
FIG. 3 is a view of an example of timing for shifting a time (line) at which a memory overrun occurs outside of an effective screen at the time of enlargement in the case where the three consecutive frames shown in FIG. 2 are input to the memory.

FIG. 3 is a view of an example of the timing for shifting the time (line) at which memory overrun occurs outside of the effective screen at the time of enlargement in a case of input of the three consecutive frames shown in FIG. 2 to a memory.

Figure 4:
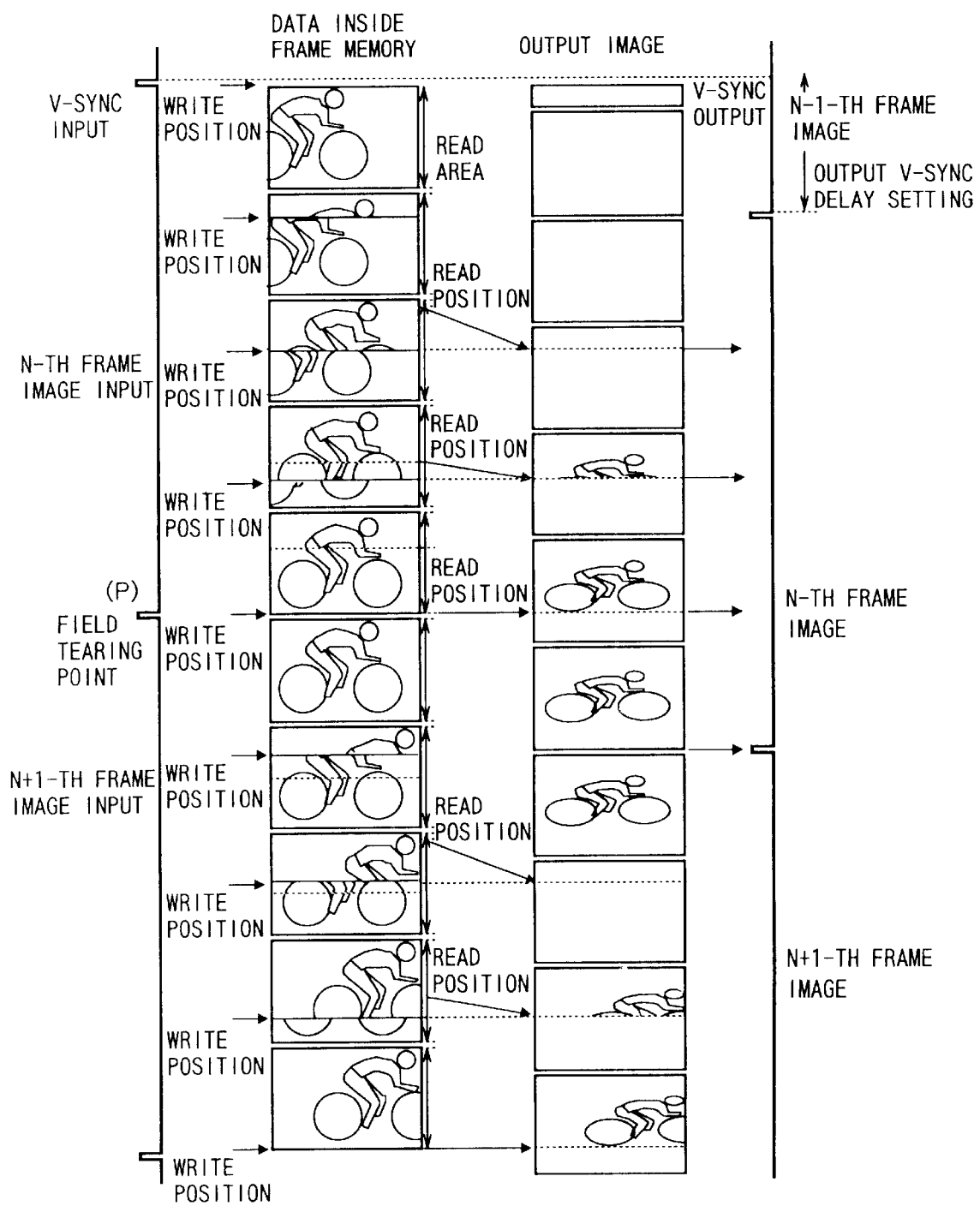
FIG. 4 is a view of an example of timing for shifting a time (line) at which a memory overrun occurs outside of an effective screen at the time of reduction in the case where the three consecutive frames shown in FIG. 2 are input to the memory.

Similarly, FIG. 4 is a view of the example of the timing for shifting the time (line) at which memory overrun occurs outside of the effective screen at the time of reduction in a case of input of the three consecutive frames shown in FIG. 2 to a memory.

Even if the read access speed and the write access speed with respect to the image memory 123 differ, the vertical frequencies of the input and output are identical, so there is always one point where the field tearing occurs in a vertical cycle.

Accordingly, by setting the phase of the output vertical synchronization signal V-SYNC so that the read end position and the write position of the output image match in the time (point P in FIG. 3 and FIG. 4), it becomes possible to shift the point where the field tearing occurs to the point P.

Also, due to the occurrence of the field tearing on the end line of output, the occurrence of field tearing will be impossible in one vertical cycle before that.

Next, an explanation will be given of a concrete method of detection of a read end time and a flow of processing thereof.

Note that, in the present example, the occurrence of field tearing at the end line of output was explained, but in actuality, by adjusting the fixed value of a few lines to the obtained phase setting, complete restraint of the field tearing to the blanking period can be easily realized.

Figure 5:
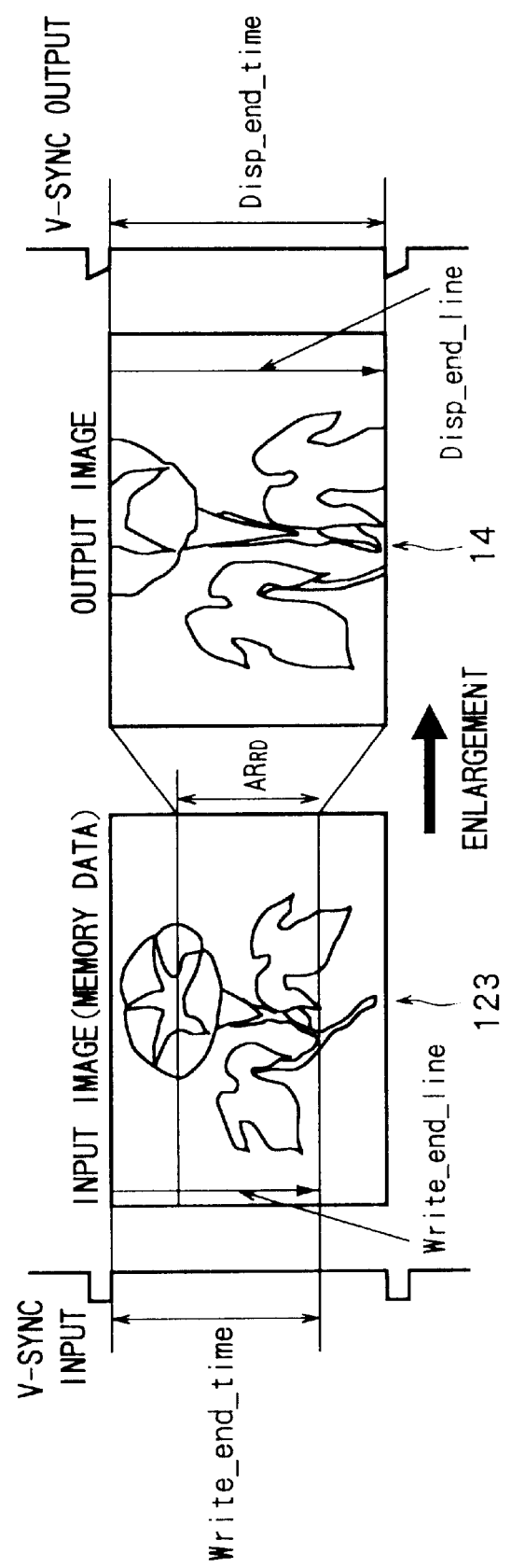
FIG. 5 is a view for explaining a method of detection of the read end time at the time of enlargement and showing an image write area and read area of the frame memory in a case where an image is enlarged 2-fold in a vertical synchronization mode at an input of a still image.

FIG. 5 is a view for explained the method of detection of the read end time at the time of enlargement and shows the image write area and read area of the frame memory in the case of enlarging an image 2-fold in the vertical synchronization mode at the time of input of a still image.

Figure 6:
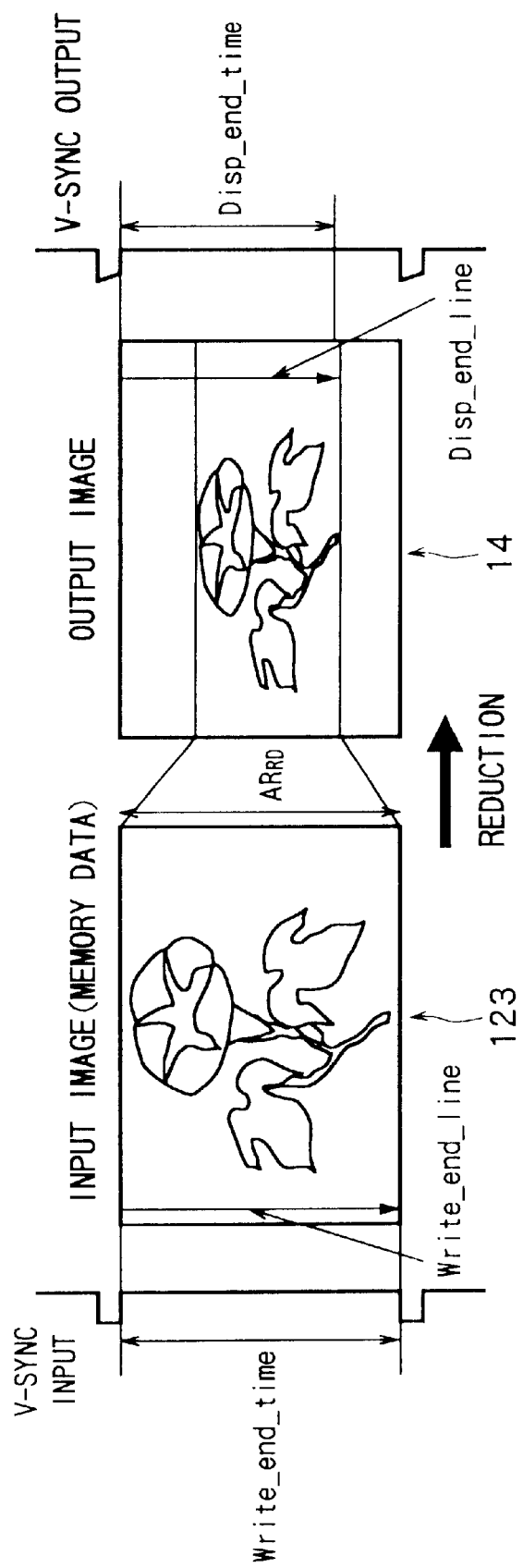
FIG. 6 is a view for explaining a method of detection of the read end time at the time of enlargement and showing an image write area and read area of the frame memory in a case where an image is reduced to ½ in a vertical synchronization mode at an input of a still image.

Similarly, FIG. 6 is a view for explained the method of detection of the read end time at the time of reduction and shows the image write area and read area of the frame memory in the case of reducing an image to ½ in the vertical synchronization mode at the time of input of a still image.

Figure 7:
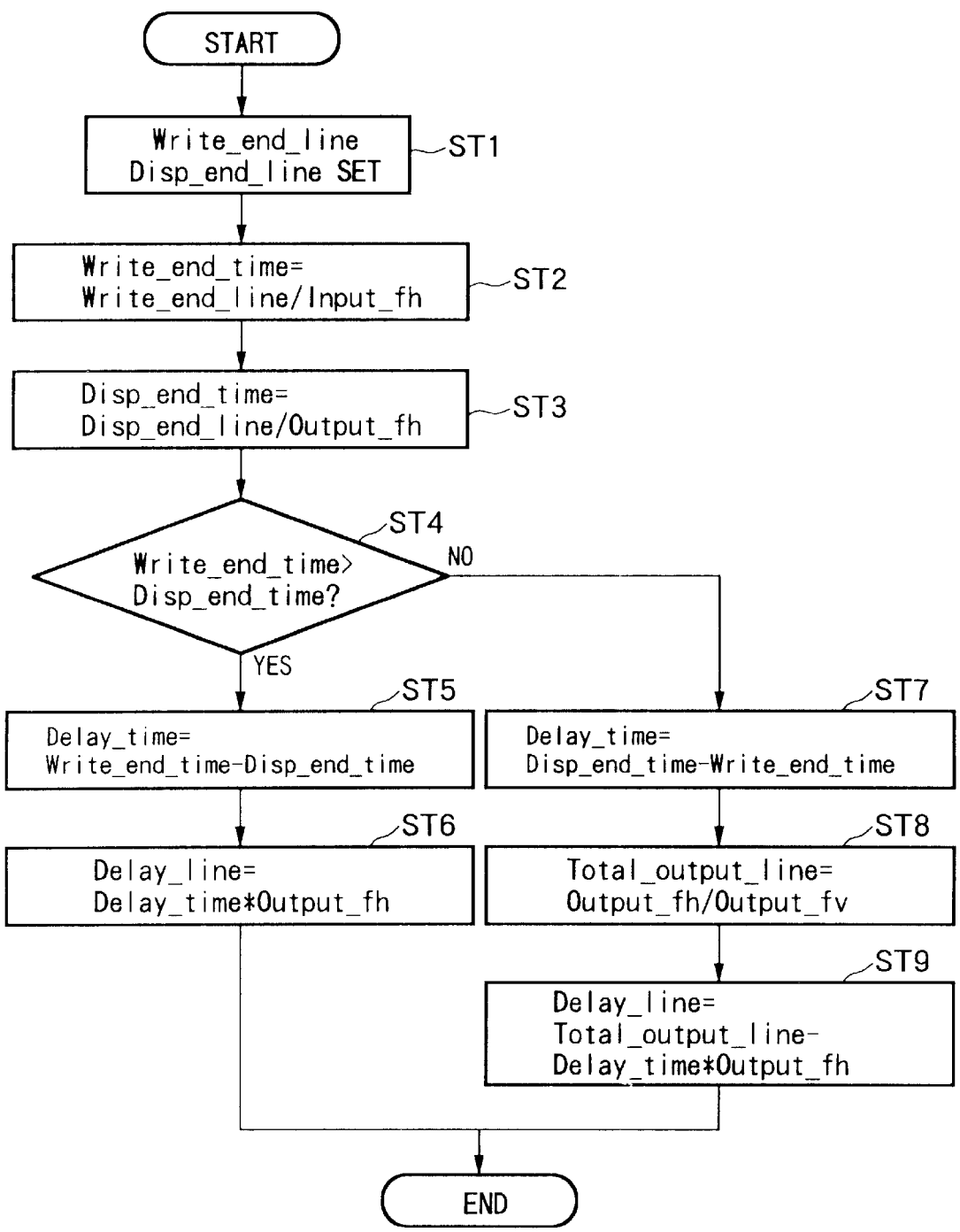
FIG. 7 is a flowchart for explaining the method of detection of the read end time.

Further, FIG. 7 is a flowchart for explaining the method of detection of the read end time.

Next, an explanation will be given of the flow of processing for detection of the read end time based on these figures.

Here, the processing for matching the read end line means to calculate the delay lines so as to satisfy the following equation (1), where the "write end time" is the time required for writing the last line of the data read from the memory, that is, the "write end line", the "display end time" is the time required for displaying the last display line of the output image, that is, the "display end line", and the "ldelay time" is the time required for displaying the number of lines of delay of the output image, that is, the "delay lines", that is, where:

"Write end line": The last line read from the memory expressed as a line number, "Write end time": The time of the end of the read operation from the memory expressed in units of seconds, "Display end line": The last line of the display image expressed as a line number, "Display end time": The time of the end of the image display expressed in units of seconds, "Delay lines": The number of lines of phase adjustment of the output V-SYNC expressed in units of lines, and "Delay time": The time of delay of the output V-SYNC expressed in units of seconds.

$$\text{Write end time} = \text{Display end time} \pm \text{Delay time} \qquad (1)$$

First, the last line read from the memory, that is, the "write end line", and the last line of the display image, that is, the "display end line", are set (ST1).

Here, by defining the input signal horizontal frequency as "input fh", the output image horizontal frequency as "output fh", and the vertical frequency as "output fv", the time of the end of the read operation from the memory, that is, the "write end time", is found by the following equation (ST2):

$$\text{Write end time} = \text{Write end line/Input fh [sec]} \qquad (2)$$

Also, the time of the end of the image display, that is, the "display end time", is found by the following equation (ST3):

$$\text{Display end time} = \text{Display end line/Output fh [sec]} \qquad (3)$$

Then, a decision is made of whether or not the time of the end of the read operation from the memory, that is, the "write end time", is larger than the time of the end of the image display, that is, the "display end time" (ST4).

When it is decided at step ST4 that the time of the end of the read operation from the memory, that is, the "write end time", is larger (write end time>display end time), it is decided that the image is being reduced, while when it is decided that the time of the end of the read operation from the memory, that is, the "write end time", is smaller or equal (write end time <display end time), it is decided that the image is left at equal magnification or is being enlarged (ST4).

1) When "write end time >display end time" (reduction), it is possible to perform the following two operations to set the number of lines of delay, that is, the "delay lines", to shift the field tearing to the end line (ST5 and ST6):

$$\text{Delay time} = \text{Write end time} - \text{Display end time} \qquad (4)$$

$$\text{Delay line} = \text{Delay time} \times \text{Output fh} \qquad (5)$$

2) When "write end time≦display end time" (equal magnification or enlargement), the following operations are is carried out (ST7):

$$\text{Delay time} = \text{Display end time} - \text{Write end time} \qquad (6)$$

$$\text{Delay line} = \text{Delay time} \times \text{Output fh} \qquad (7)$$

However, the output phase cannot be made earlier than the input V-SYNC, so it becomes possible to set the number of lines of delay, that is, "delay lines", as follows to shift the field tearing to the end line (ST8 and ST9):

$$\text{Total output lines} = \text{Output fh/Output fv} \qquad (8)$$

$$\text{Delay lines} = \text{Total output lines} - \text{Delay time} \times \text{output fh} \qquad (9)$$

Next, an explanation will be given of the processing for matching the read start time (start line).

Figure 8:
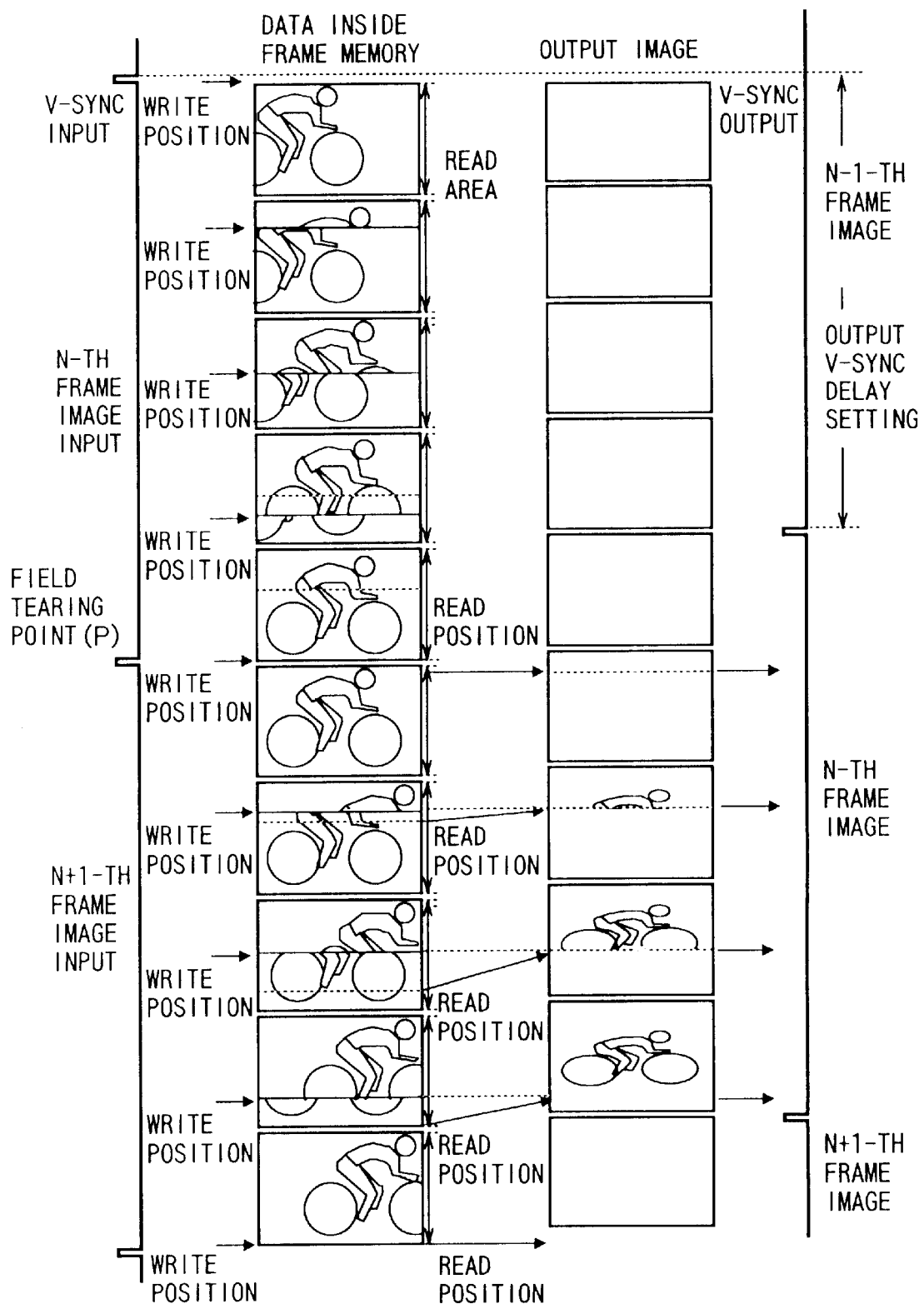
FIG. 8 is a view for explaining a processing for matching the read start time (start line) and showing an example of the timing for shifting the time (line) at which the memory overrun occurs outside of the effective screen at the time of reduction in a case where the three consecutive frames shown in FIG. 2 are input to the memory.

FIG. 8 is a view for explaining the processing for matching the read start time (start line) and shows an example of the timing for shifting the time (line) at which the memory overrun occurs outside of the effective screen at the time of reduction in a case of input of the three consecutive frames shown in FIG. 2 to the memory.

In the same way as the case of the processing for matching the read end time (line), the vertical frequencies of the input and output are identical, so there is always one point where the field tearing occurs during a vertical cycle.

Accordingly, by setting the phases of the output vertical synchronization signals V-SYNC so that the read start position and the write position of an output image match in terms of time (point P in FIG. 8), it becomes possible to set the point where the field tearing occurs at the point P.

Also, due to the occurrence of the field tearing at the output start line, the occurrence of field tearing will be impossible in one vertical cycle after that.

Next, an explanation will be given of a concrete method of detection of the read start time and the flow of processing thereof.

Figure 9:
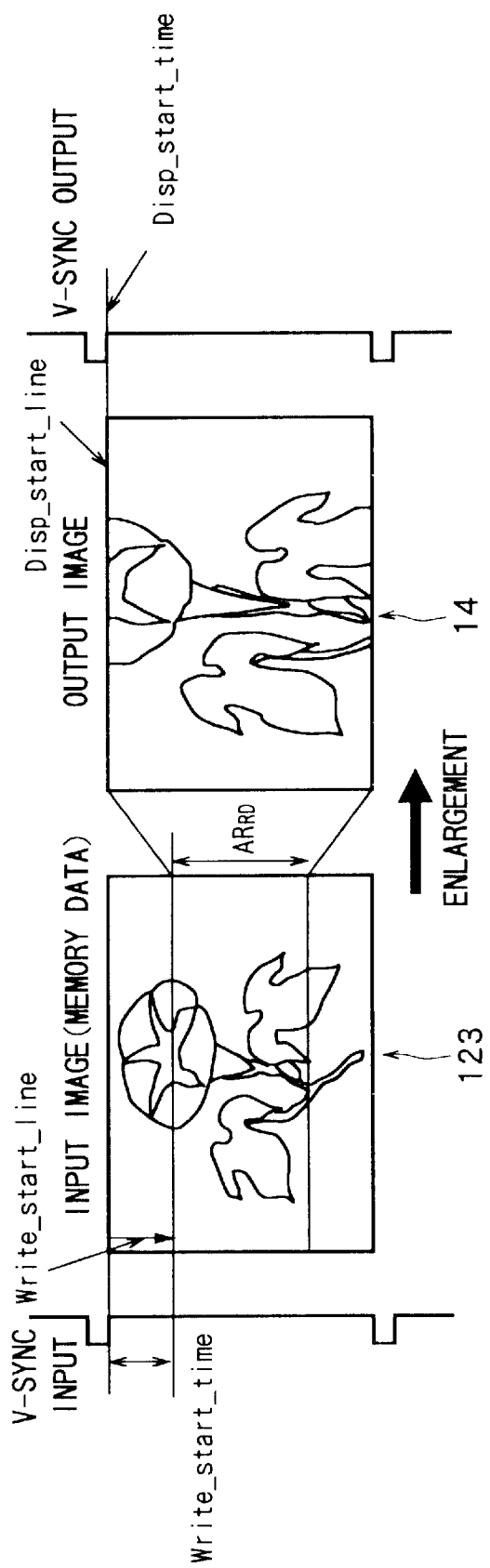
FIG. 9 is a view for explaining the method of detection of the read start time at the time of enlargement and showing the image write area and read area of the frame memory in the case where an image is enlarged 2-fold in the vertical synchronization mode at an input of a still image.

FIG. 9 is a view for explaining the method of detection of the read start time at the time of enlargement and shows an image write area and read area of a frame memory in the case where an image is enlarged 2-fold in the vertical synchronization mode at the time of input of a still image.

Figure 10:
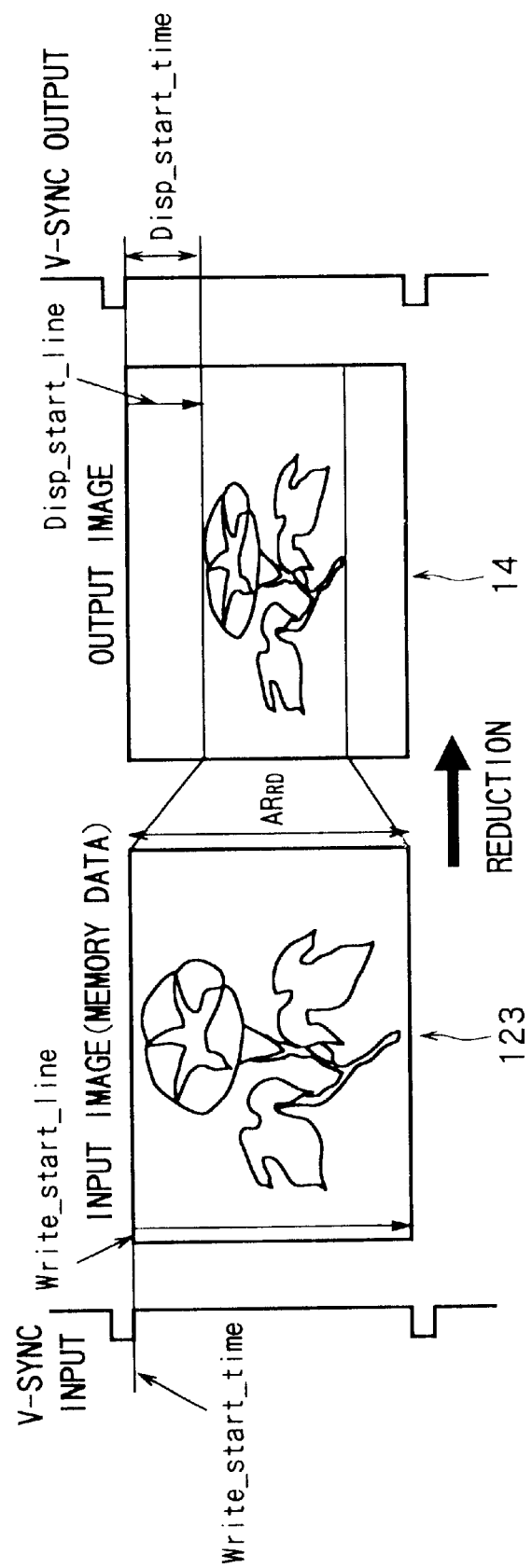
FIG. 10 is a view for explaining the method of detection of the read start time at the time of reduction and showing the image write area and read area of the frame memory in the case where an image is reduced to 1/2 in the vertical synchronization mode at an input of a still image.

Similarly, FIG. 10 is a view for explaining the method of detection of the read start time at the time of reduction and shows an image write area and read area of a frame memory in the case where an image is reduced to ½ in the vertical synchronization mode at the time of input of a still image.

Figure 11:
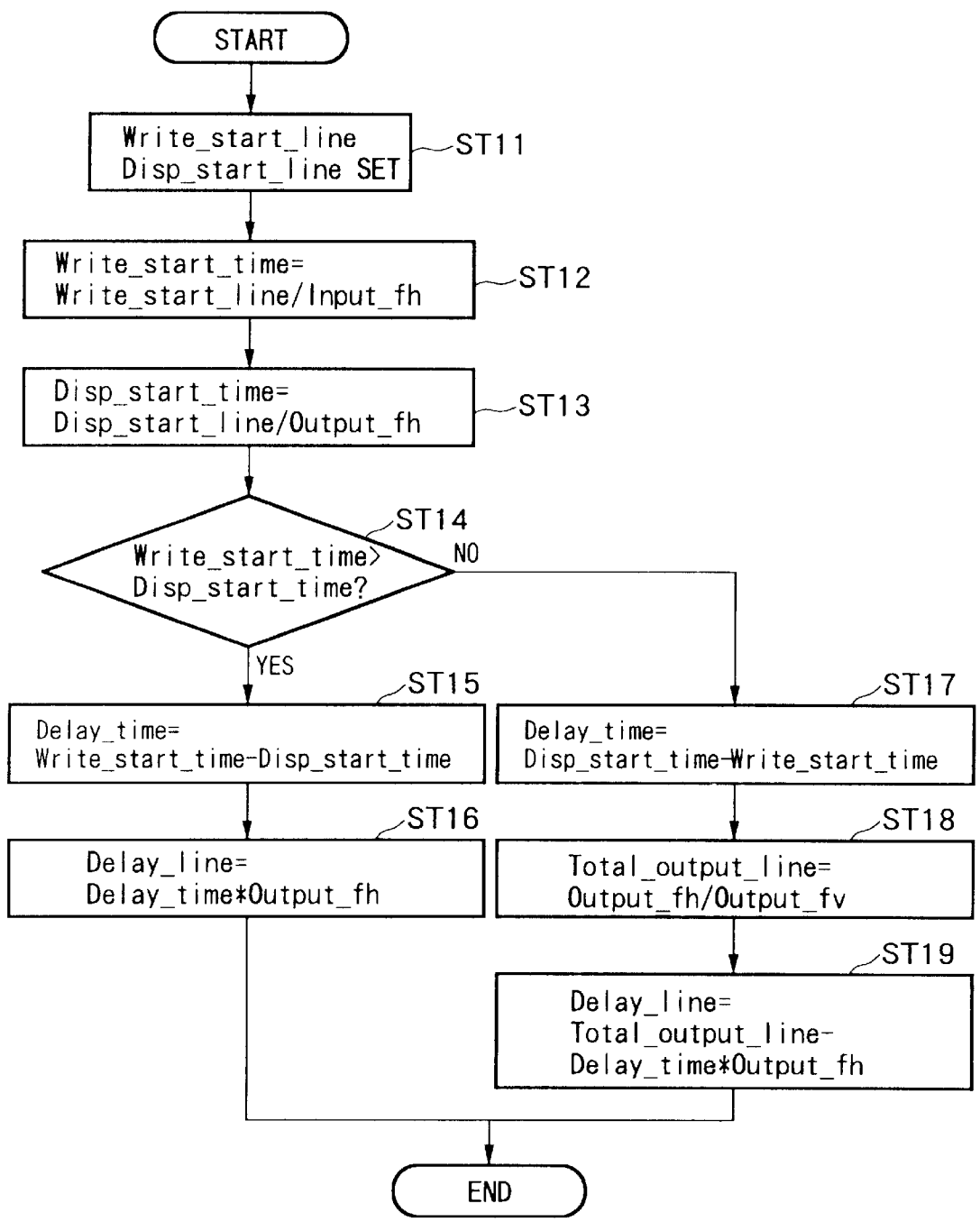
FIG. 11 is a flowchart for explaining the method of detection of the read start time.
Figure 12:
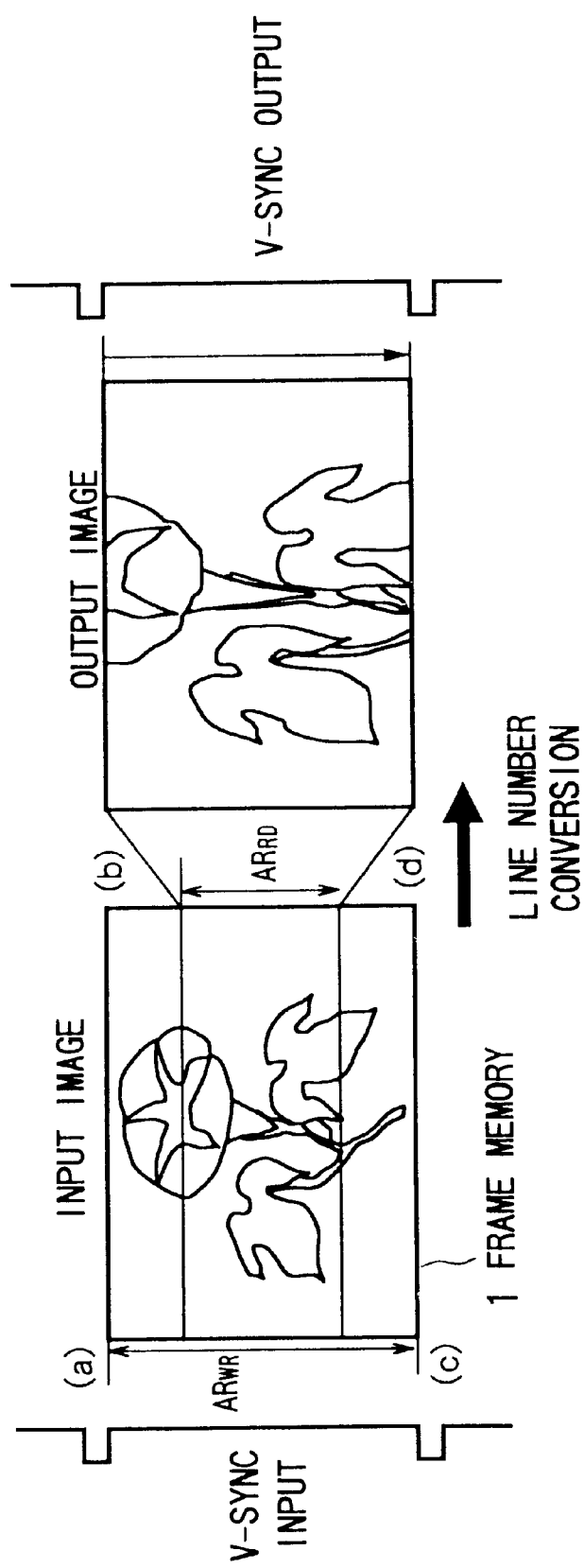
FIG. 12 is a view for explaining the problem in the prior art and showing the image write area and read area of a frame memory in a case where an image is enlarged 2-fold in the vertical synchronization mode at the input of a still image.
Figure 14:
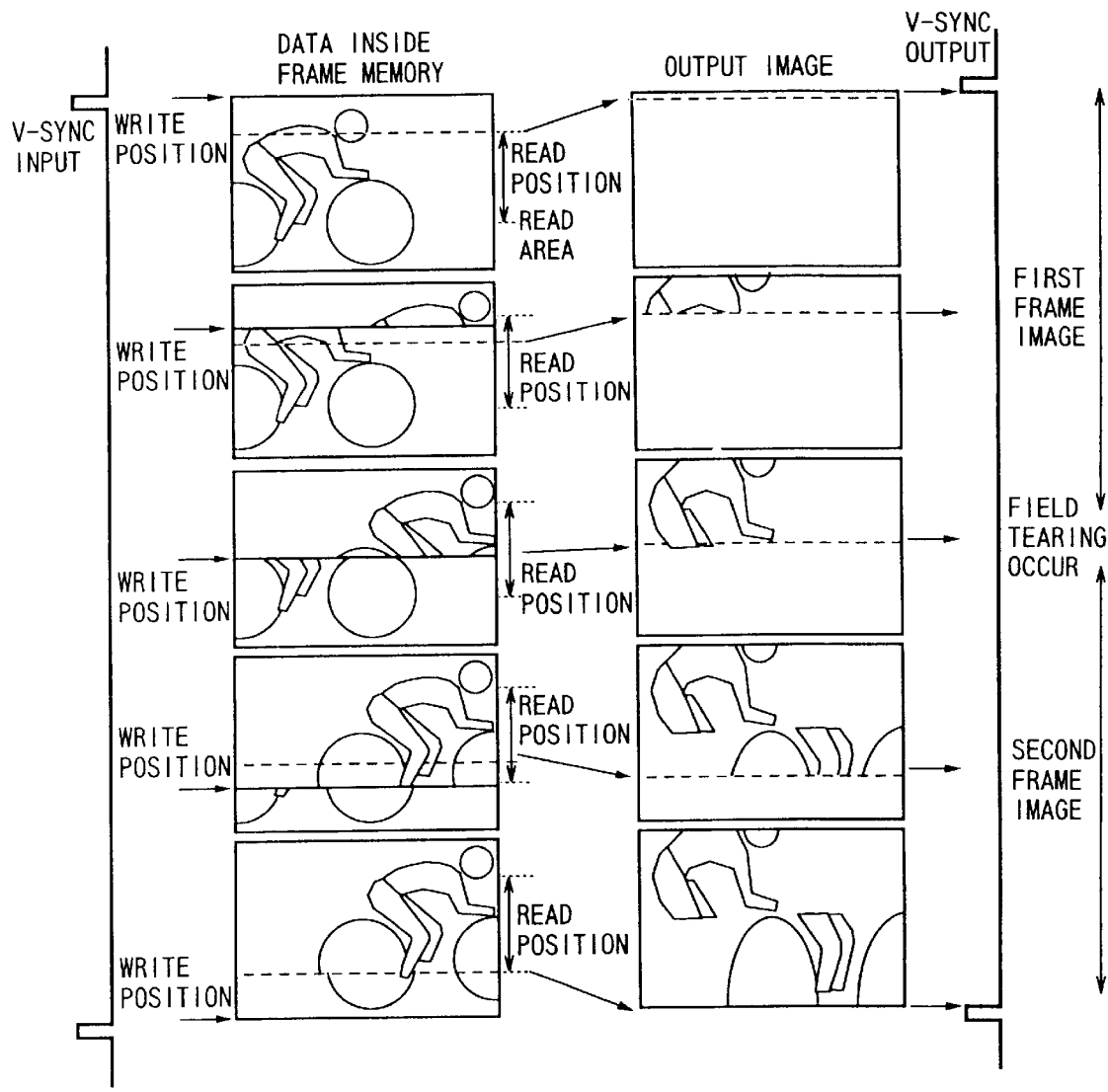
FIG. 14 is a view of the transition over time of image data inside the frame memory and output images in the case where two consecutive frames having different image information as in FIG. 13 are processed in the vertical synchronization mode.
Figure 15:
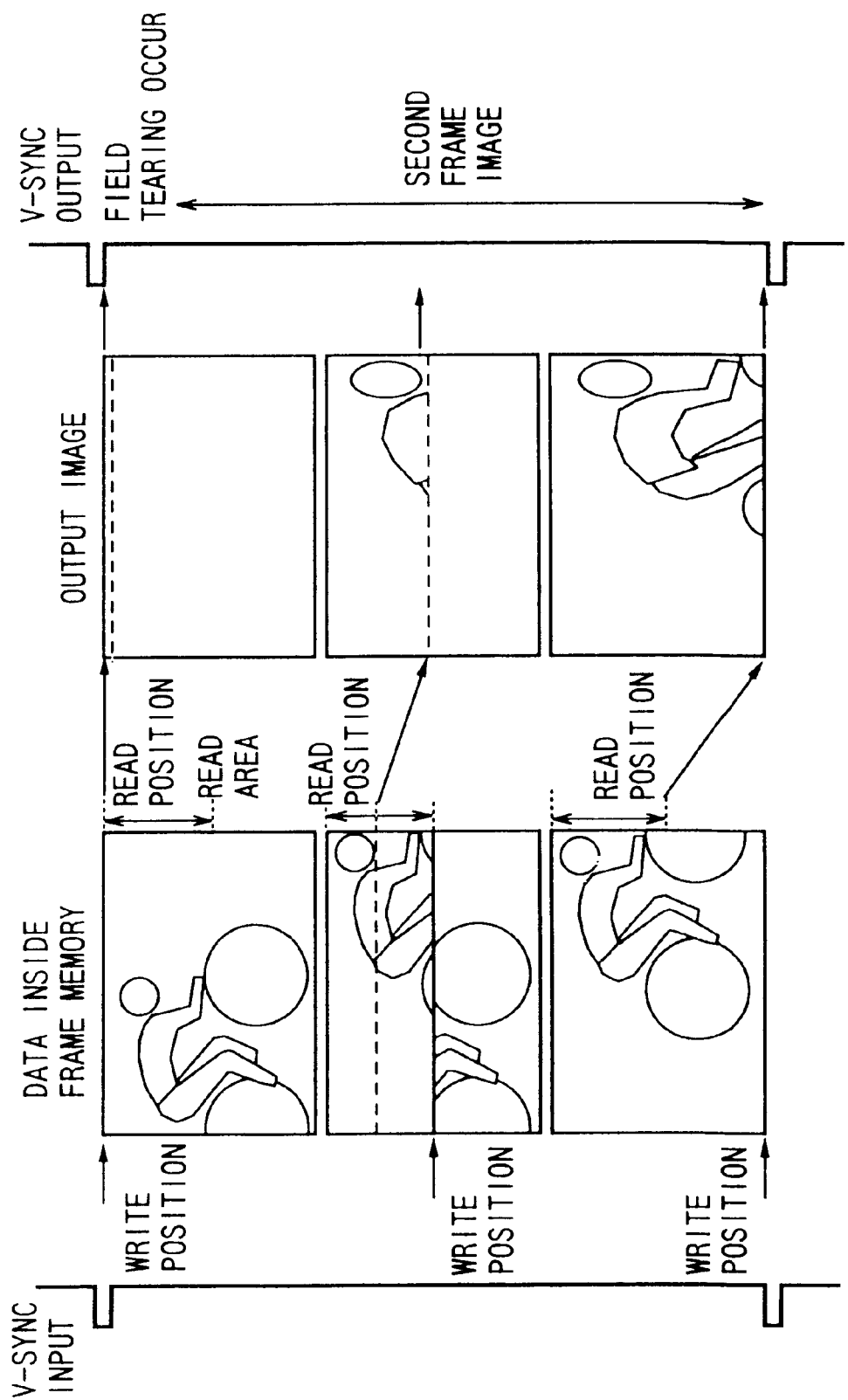
FIG. 15 is a view of the transition over time of the image data inside the frame memory and the output images in a case where an image is shifted downward.
Figure 16:
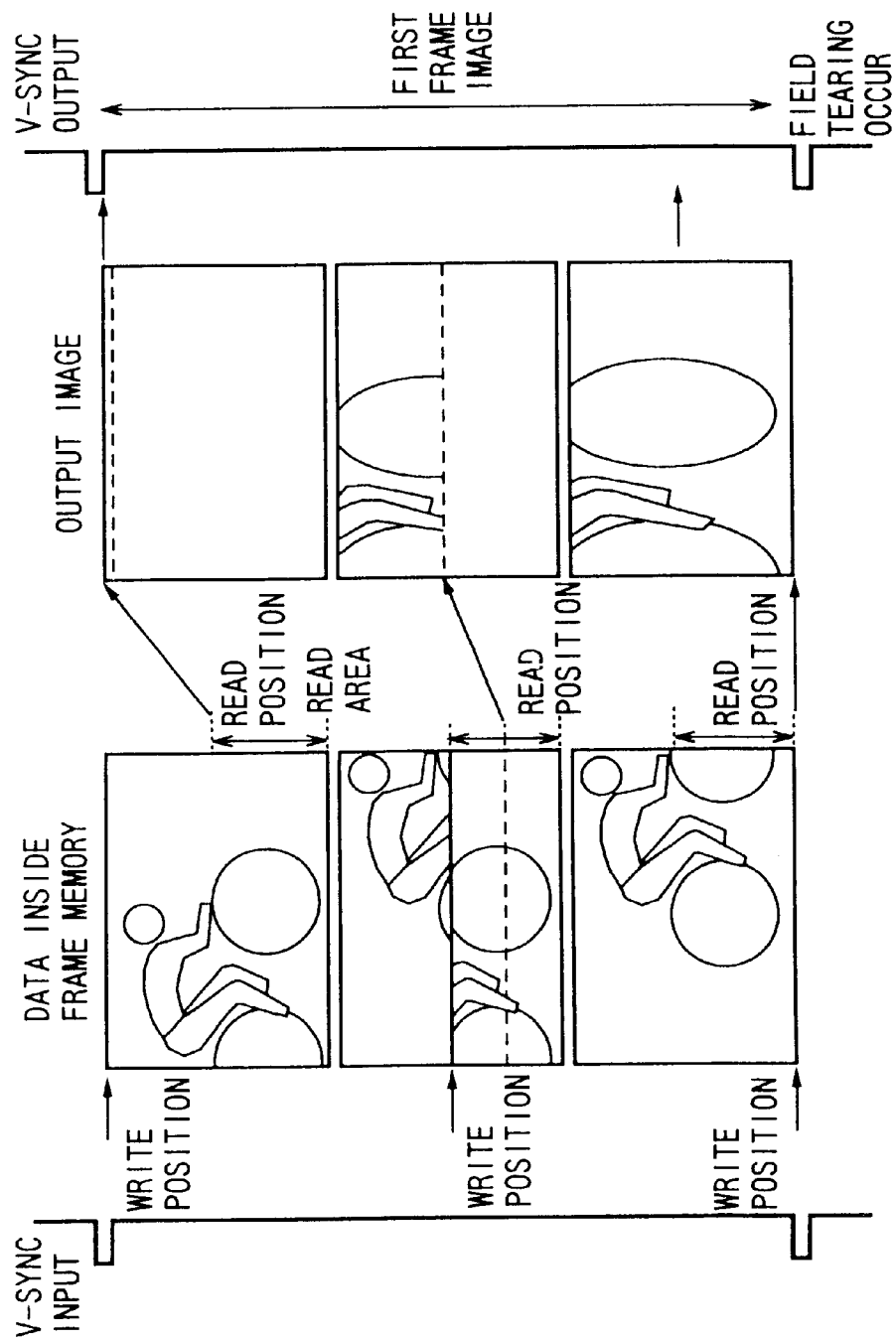
FIG. 16 is a view of th transition over time of the image data inside the frame memory and the output images in a case where an image is shifted upward.
Figure 17:
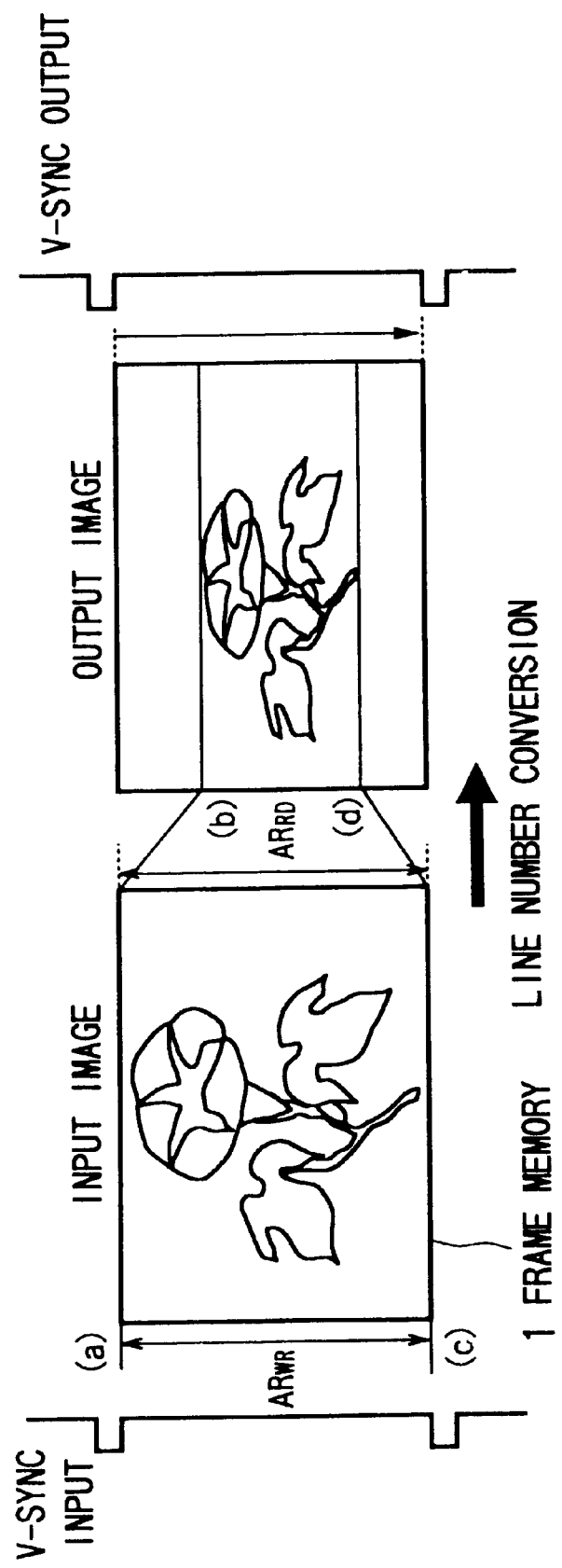
FIG. 17 is a view of the image write area and read area of the frame memory in the case where an image is reduced to ½ (image center reduction) in the vertical synchronization mode at the input of a still image.
Figure 19:
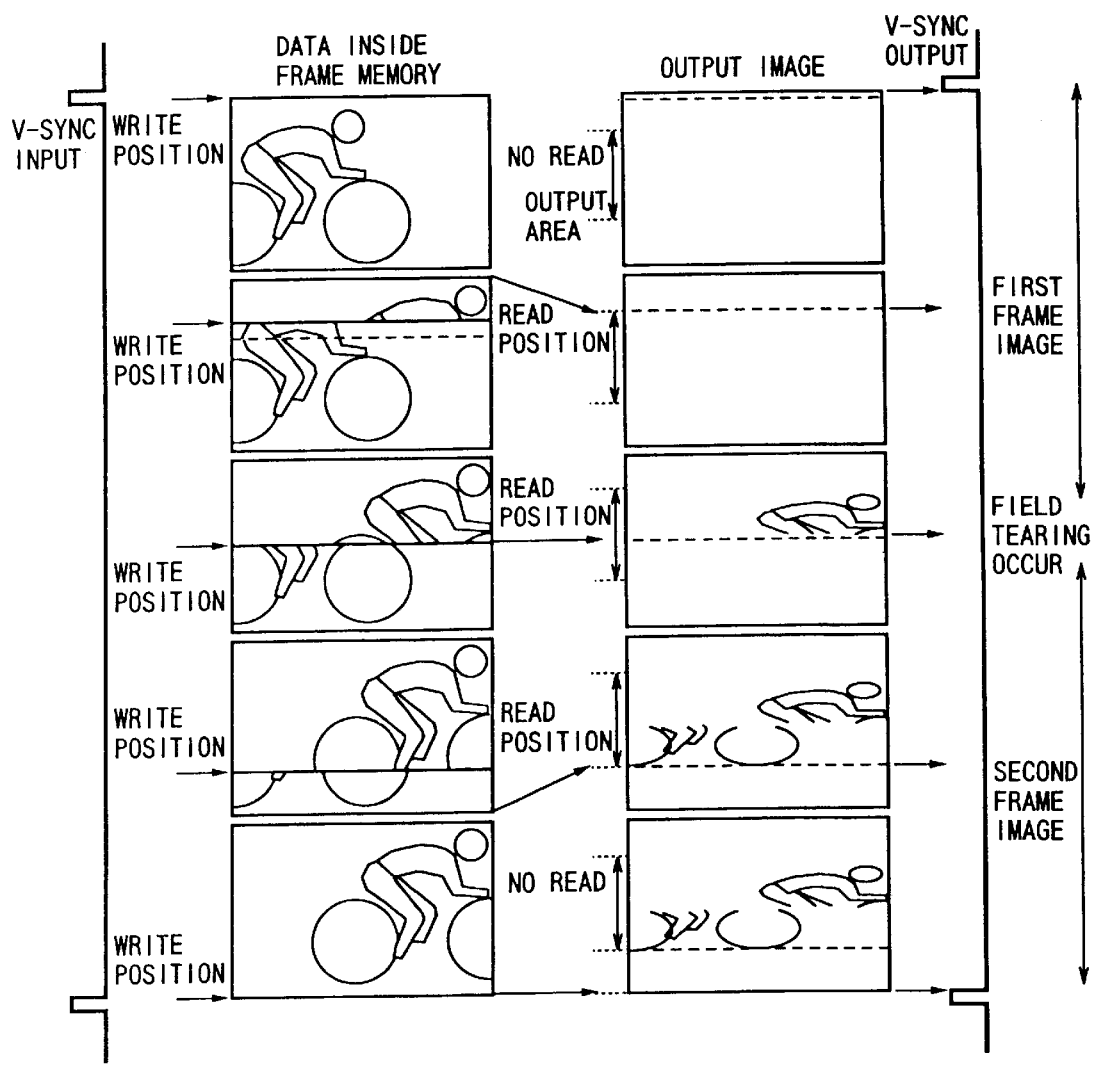
FIG. 19 is a view of the transition over time of the image data inside the frame memory and the output images in the case where two consecutive frames having different image information as in FIG. 18 are processed in the vertical synchronization mode.
Figure 20:
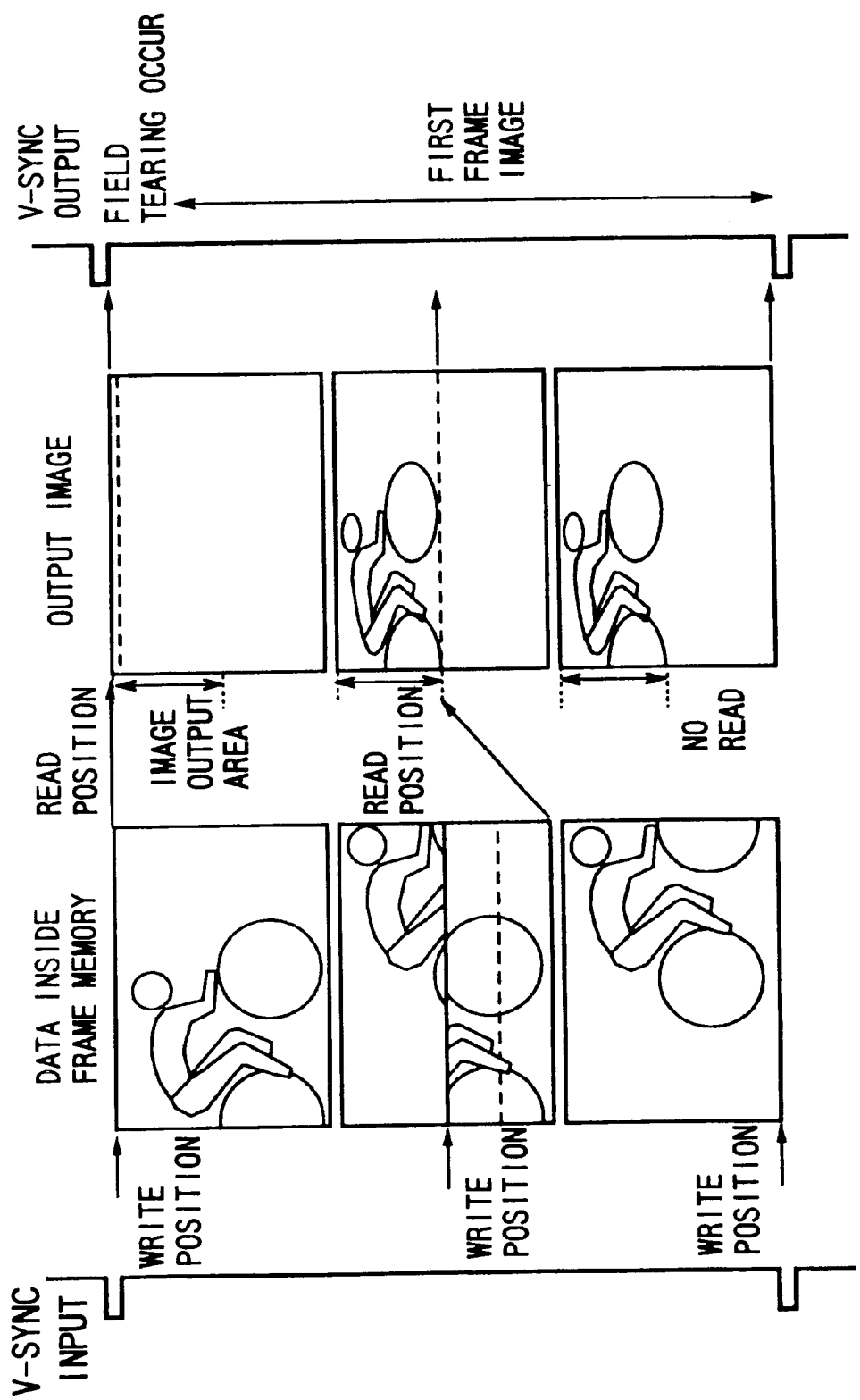
FIG. 20 is a view of the transition over time of the image data inside the frame memory and the output images in the case where an image is shifted upward.
Figure 21:
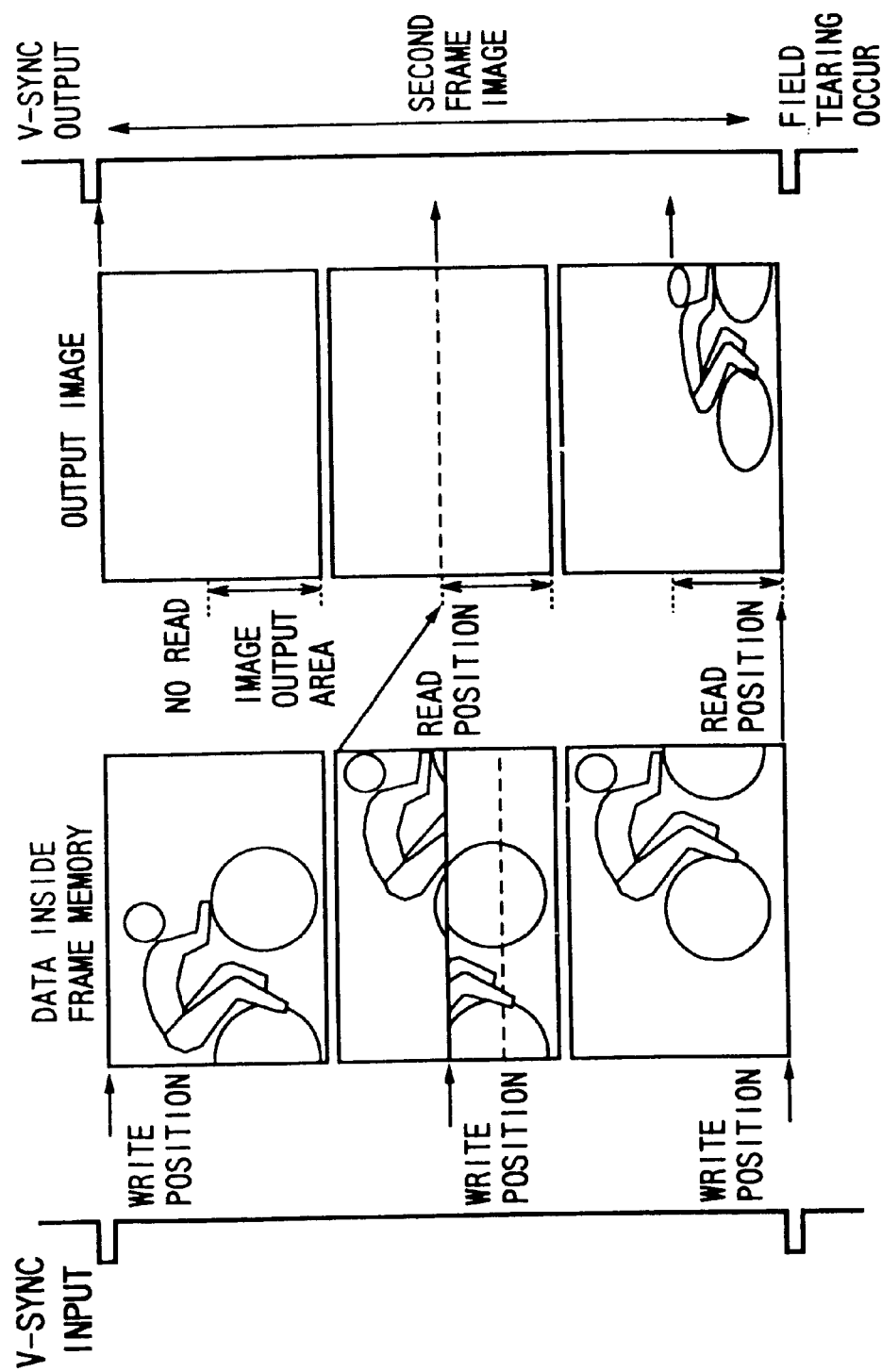
FIG. 21 is a view of the transition over time of the image data inside the frame memory and the output images in the case where an image is shifted downward.

Further, FIG. 11 is a flowchart for explaining the method of detection of the read start time.

First, an explanation will be given of the flow of detection of the read start time based on these figures.

Here, the processing for matching the read start line means to calculate the delay lines so as to satisfy the following equation (10), where the "write start time" is the time required for writing the first line of the data from the memory, that is, the "write start line", the "display start time" is the time required for displaying the first display line of the output image, that is, the "display start line", and the "delay time" is the time required for displaying the number of lines of delay of the output image, that is, the "delay lines", that is, where:

"Write start line": The first line read from the memory expressed as a line number, "Write start time": The time of the start of the read operation from the memory expressed in units of seconds, "Display start line": The first line of the display image expressed as a line number, "Display start time": The time of the start of the image display expressed in units of seconds, "Delay lines": The number of lines of phase adjustment of the output V-SYNC expressed in units of lines, and "Delay time": The time of delay of the output V-SYNC expressed in units of seconds.

Write start time=Display start time±Delay time  (10)

First, the first line of the read operation from the memory, that is, the "read start line", and the first line of the display image, that is, the "display start line", are set (ST11).

Here, when defining the input signal horizontal frequency as "input fh", the output image horizontal frequency as "output fh", and the vertical frequency as "output fv", the "write start time" is found by the following equation (ST12):

Write start time=Write start line/Input fh (sec)  (11)

Also, the time of start of the image display from the memory, that is, the "display start time", is found by the following equation (ST13):

Display start time=Display start line/Output fh (sec)  (12)

Then, a decision is made as to whether or not the time of start of the read operation from the memory, that is, the "write start time", is larger than the time of start of the image display from the memory, that is, the "display start time" (ST14):

When it is decided at step ST14 that the time of start of the read operation from the memory, that is, the "write start time", is larger (write start time>display start time), it is decided that the image is being enlarged, while when it is decided that the time of start of the read operation from the memory, that is, the "write start time", is smaller or equal (write start time≦display start time), it is decided that the image is at equal magnification or is reduced (ST14).

1) When "write start time>display start time" (enlargement), it is possible to perform the following two operations to set the number of lines of delay, that is, the "delay lines". to shift the field tearing to the end line (ST15 and ST16):

Delay time=Write start time−Display start time  (13)

Delay lines=Delay time×Output fh  (14)

2) When "write_start time≦display start time (equal multiplication or reduction), the next processing is carried out (ST17).

Delay time=Display start time−Write start time  (15)

Delay line=Delay time×Output fh  (16)

However, the output phase cannot be made earlier than the input V-SYNC, so it becomes possible to set the number of lines of delay, that is, "delay lines", as follows to shift the field tearing to the end line (ST18 and ST19):

Total output lines=Output fh/Output fv  (17)

Delay lines=Total output lines−Delay time×Output fh  (18)

Next, an explanation will be given of the operation by the above configuration.

First, an analog image signal AIM is converted to a digital signal by the A/D converter 11 and it is supplied to the scan converter 12.

Also, in the system MC 13, the processing data D13a for generating the write timing and the read timing of the image memory 123 of the scan converter 12 is generated and it is supplied to the system processing logic 127.

In addition, in the system MC 13, the output delay data D13b is generated for delaying the image output timing based on the write speed to the image memory 123, the read speed from the image memory 123, and the read area so that the timing of access to the read end address (or the timing of access to the read start address) and the time for performing a write operation to the same address match and it is supplied to the image read controller 126.

In the system processing logic 127 of the scan converter 12, the timing for writing the image signal to the image memory 123 and the timing for reading the same from the image memory 123 is generated based on the supplied horizontal synchronization signal H-SYNC and vertical synchronization signal V-SYNC and the processing data D13a supplied by the system MC 13.

Then, the write timing is supplied as the write timing signal S127a to the image write controller 125, and the read timing is supplied as the read timing signal S127b to the image read controller 126.

In the image write controller 125, the control signal S125 is generated based on the write timing signal S127a supplied by the system processing logic 127 and it is supplied to the input unit 121.

Due to this, the digital image signal from the A/D converter 11 is written at the designated address of the image memory 123 via the input unit 121 based on the control signal S125 from the image write controller 125.

Also, in the image read controller 126 the output delay signal S126 is generated based on the read timing signal S127b supplied by the system processing logic 127 and the output delay data supplied by the system MC 13 and it is output to the pixel number converter 124.

Based on this, in the pixel number converter 124, the timing of the image signal read from the image memory 123 is delayed by exactly the amount of the delay based on the output delay processing signal S126 and the read image signal is supplied to the output unit 122 at equal magnification as is or after image enlargement or image reduction.

Then, the read image signal from the pixel number converter 124 is output via the output unit 122 to the display 14 for display.

In this way, when writing to the identical image memory and reading from the image memory, the scan converter 12 receives the processing data and output delay data supplied by the system MC 13 and delays the image output timing so that the timing of access to the read end address (or the timing of access to the read start address) and the timing for performing a write operation to the same address match, so the field tearing (memory overrun) occurring when the image write speed and the read speed to and from the identical image memory are different is avoided.

As explained above, according to the present embodiment, since provision is made of the system MC 13 for generating and supplying the processing data D13a for generating the write timing and the read timing of the image memory 123 and generating and supplying the output delay data D13b for delaying the image output timing based on the write speed to the image memory 123, the read speed from the image memory 123, and the read area so that the timing of access to the read end address (or the timing of access to the read start address) and the timing for performing a write operation to the same address match and of the scan converter 12 for receiving the processing data and the output delay data supplied by the system MC 13 and delaying the image output timing so that the timing of access to the read end address (or the timing of access to the read start address) and the timing for performing a write operation to the same address match, field tearing can be avoided in various input/output signals and in image enlargement/reduction.

Accordingly, field tearing can be automatically avoided in NTSC, PAL, DTV, and all other moving images.

Also, since there is no restriction on the image size and the image display position, there is the advantage that field tearing can be automatically avoided for any adjustment state such as the time of enlargement of a partial image and shift of the enlarged image at the time of multi-screen display and reduction of an image by a two-screen function or the like.

In the above mentioned embodiment, an image processing apparatus and a method of the same were explained, but the present invention can be widely applied to a display apparatus in which intended image input terminals such as NTSC/PAL/DTV are provided, and which processes input signal thereof by the image processing apparatus according to the present invention, and displays the same to the display device such as the PDP or the like.

Summarizing the effects of the invention, as explained above, according to the present invention, even when performing read and write operations of input/output images with respect to a single image memory, the occurrence of field tearing (memory overrun) can be automatically avoided.

Also, since there is no restriction on the image size and the image display position, there is the advantage that field tearing can be automatically avoided for any adjustment state such as the time of enlargement of a partial image and shift of the enlarged image at the time of multi-screen display and reduction of an image by a two-screen function or the like.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus having a single image memory for performing simultaneously read and write operations in parallel of input images and for outputting enlarged images, reduced images, or shifted images, comprising:
    a system processing circuit for generating a write timing for writing the input images to the image memory and a read timing for reading an image from the image memory based on horizontal synchronization signals and vertical synchronization signals; and
    a delay circuit for delaying said read timing for reading based on a read area of the image memory, a write speed to the image memory, and a read speed to the image memory, so as to shift a point where a field tearing occurs to a blanking period.

2. The image processing apparatus as set forth in claim 1, wherein
    the delay circuit delays said read timing for reading by setting phases of the output vertical synchronization signals so that the read position and the write position match in time outside of an effective screen.

3. The image processing apparatus as set forth in claim 1, further comprising
    a write controller for supplying a control signal to write at a designated address of the image memory based on said write timing from said system processing circuit; and
    a read controller for generating a delay signal to read at a designated address of the image memory by an amount of delay output from said delay circuit,
    wherein the delay circuit delays the image output timing so that the timing of access to a read end address and the timing for performing a write operation at substantially a same address substantially match.

4. The image processing apparatus as set forth in claim 1, further comprising:
    a write controller for supplying a controller signal to write at a designated address of the image memory based on said write timing from said system processing circuit; and
    a read controller for generating a delay signal to read at a designated address of the image memory by an amount of delay output from said delay circuit,
    wherein the first circuit delays the image output timing so that the timing of access to a read start address and the timing for performing a write operation at substantially a same address substantially match.

5. An image processing method for performing simultaneously read and write operations of input images and for outputting enlarged images, reduced images, or shifted images, comprising:

a first step of generating a write timing for writing the input images to the image memory and a read timing for reading an image from the image memory based on horizontal synchronization signals and vertical synchronization signals; and a second step of delaying said read timing for reading based on a read area of the image memory, a write speed to the image memory, and a read speed from the image memory so as to shift a point where field tearing occurs to a blanking period.

6. The image processing method as set forth in claim 5, wherein the second step of delaying the read timing for reading includes setting phases of the output vertical synchronization signals, so that the read position and the write position match in time at a point outside of an effective screen.

7. The image processing method as set forth in claim 5, further comprising:

a step for supplying a control signal to write at a designated address of the image memory based on said write timing from said first step; and a step for generating a delay signal to read at a designated address of the image memory by an amount of the delay output from said second step, wherein the second step delays the image output timing so that the timing of access to a read end address and the timing for performing a write operation at substantially a same address substantially match.

8. The image processing method as set forth in claim 6 further comprising:

a step for supplying a control signal to write at a designated address of the image memory based on said write timing from said first step; and a step for generating a delay signal to read at a designated address of the image memory by an amount of delay output from said second step, wherein the second step delays the image output timing so that the timing of access to a read start address and the timing for performing a write operation at substantially a same address substantially match.

* * * * *